United States Patent
Sakiyama et al.

(10) Patent No.: US 7,643,163 B2
(45) Date of Patent: Jan. 5, 2010

(54) DATA PROCESSING APPARATUS, DATA PROCESSING METHOD AND IMAGE FORMING APPARATUS HAVING A PLURALITY OF COMPRESSION/DECOMPRESSION DEVICES

(75) Inventors: Daisuke Sakiyama, Maizuru (JP); Nobuo Kamei, Amagasaki (JP); Masaya Hashimoto, Amagasaki (JP); Takeshi Morikawa, Takarazuka (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1089 days.

(21) Appl. No.: 10/626,672

(22) Filed: Jul. 25, 2003

(65) Prior Publication Data

US 2005/0174598 A1 Aug. 11, 2005

(30) Foreign Application Priority Data

Mar. 20, 2003 (JP) .............................. 2003-078889

(51) Int. Cl.
*G06F 15/00* (2006.01)
*H04N 1/46* (2006.01)

(52) U.S. Cl. ...................................... 358/1.15; 358/539

(58) Field of Classification Search ................. 358/1.1, 358/1.5, 1.9, 1.15, 448, 407, 426.04, 426.11, 358/539

See application file for complete search history.

(56) References Cited

U.S. PATENT DOCUMENTS

| 6,327,043 | B1 * | 12/2001 | Rumph et al. ............... 358/1.15 |
| 6,381,031 | B1 * | 4/2002 | Mishima ..................... 358/1.15 |
| 2001/0048823 | A1 * | 12/2001 | Nomura et al. ............... 399/80 |
| 2002/0060801 | A1 * | 5/2002 | Motamed et al. ........... 358/1.13 |
| 2004/0095605 | A1 * | 5/2004 | Moro ......................... 358/2.1 |

FOREIGN PATENT DOCUMENTS

| JP | 6-44013 | 2/1994 |
| JP | 8-98034 | 4/1996 |
| JP | 9-219782 | 8/1997 |
| JP | 9-298652 | 11/1997 |
| JP | 2000-318229 | 11/2000 |

* cited by examiner

*Primary Examiner*—Gabriel I Garcia
(74) *Attorney, Agent, or Firm*—Buchanan Ingersoll & Rooney PC

(57) ABSTRACT

A data processing apparatus includes one or a plurality of input portions, one or a plurality of output portions, a plurality of compressing/expanding devices which compress data-to-be-outputted included in a job inputted from any one of an input portions and expand the compressed data-to-be-outputted, and a job discrimination portion which discriminates whether the job inputted from any one of the input portions is not required to be outputted without delay. Depending on a discrimination result of the job discrimination portion, a controller controls operation assignment of a plurality of compressing/expanding devices and activates assigned compressing/expanding devices for the job.

13 Claims, 5 Drawing Sheets

DATA PROCESSING APPARATUS, DATA PROCESSING METHOD AND IMAGE FORMING APPARATUS HAVING A PLURALITY OF COMPRESSION/DECOMPRESSION DEVICES

Priority is claimed to Japanese Patent Application No. 2003-78889, filed on Mar. 20, 2003, the disclosure of which is incorporated by reference in its entirety.

BACKGROUND OF THE INVENTION

1. Field of the Invention

The present invention relates to a data processing apparatus, a data processing method and an image forming apparatus which can be used as a MFP (Multi Function Product) equipped with multiple functions such as a copying function, a scanner function and a facsimile function.

In the following description, a facsimile and an internet-facsimile will be abbreviated as "FAX" and "IFAX" respectively.

2. Description of Related Art

The following description sets forth the inventor's knowledge of related art and problems therein and should not be construed as an admission of knowledge in the prior art.

To realize the multiple functions, a MFP as mentioned above is equipped with a plurality of input portions such as a receiving portion for receiving print jobs sent from an external apparatus such as a personal computer (hereinafter referred to as "PC") via a network, a receiving portion for receiving FAX jobs sent from an external apparatus such as a FAX machine via a communication line network and an original reading portion for reading an original.

Further equipped are a printer portion for printing an image data read by the original reading portion or a print data from the external apparatus, a working memory for spreading a data-to-be-outputted inputted from each input means and a file memory for storing the once inputted data for second and subsequent outputs.

In order to minimize the storage capacity of the data to be stored in the file memory, in general, a compressing/expanding device for compressing or expanding data is equipped. The data spread on the working memory is transferred to the compressing/expanding device to be compressed, and the compressed data is stored in the file memory.

In such a MFP, in cases where a print job is inputted from an external apparatus or the like, the print data included in the inputted job is spread on the working memory and the spread data is transferred to the printing portion for printing. Simultaneously, the data is transferred to the compressing/expanding device to be compressed and then stored in the file memory. In cases where a second one is printed, the compressed data stored in the file memory is expanded by the compressing/expanding device and transferred to the working memory again. Then, the data is transferred to the print portion for printing.

In the meantime, there is a possibility that a copy job for reading an original at an original reading portion and then transmitting the read original data to an external apparatus may sometimes be inputted during the print job processing. In this case, since the print job is being executed, i.e., the compressing/expanding device is being used, the initiation of the copy job will be delayed until the compressing/expanding device is released.

Furthermore, even in cases where this print job is a job such as a confidential print job which is not required to be printed without delay, the subsequent copy job cannot be executed until the completion of the current print job, which causes the user of the copy job frustration.

U.S. Pat. No. 6,381,031 discloses a technique in which the assignment of the compression/expansion operation to be allotted to the compressing/expanding devices connected in parallel is changed depending on the quantity of the data-to-be-outputted. For example, the U.S. Patent discloses that, in cases where the code data is read out from the file memory while thinning out or only the code data of even-numbered pages is read out, since the quantity of data to be stored in the file memory is greater than that of the image data to be read out, the number of the compressing/expanding devices for executing the compression operation is increased and that for executing the expansion operation is decreased. Furthermore, the U.S. Patent discloses that, in the case of a sort copy, all of the compressing/expanding devices are used to compress the data of the first original, half of them are used to compress and expand the data of the second and subsequent originals, and all of them are used to expand the compressed data after the completion for storing the data.

According to the technique disclosed in the aforementioned U.S. Patent, although it discloses an efficient operation of the compressing/expanding devices, it fails to disclose such technical concept that the initiation of the subsequent job is expedited depending on whether the previous job is not required to be outputted without delay. Thus, it was not enough to solve the aforementioned problems.

It may be considered that the compressing/expanding devices are classified into compressing/expanding devices to be exclusively used for compressing data and compressing/expanding devices to be exclusively used for expanding data, wherein the data compression for the previous job is executed by the compressing/expanding devices to be exclusively used for compressing data and thereafter the data compression for the subsequent job is also executed by the same compressing/expanding devices to thereby expedite the initiation of the subsequent job.

In this case, however, even in cases where the previous job is required to be outputted without delay, the data of the previous job is compressed or expanded always by the small number of compressing/expanding devices, resulting in a deteriorated reading speed of the job or a deteriorated productivity of the output. Furthermore, during the compressing/expanding processing of the data of the previous job, the initiation of the subsequent job cannot be executed.

Furthermore, it may be considered to change the assignment of the compressing/expanding devices for the previous job after the input of the subsequent job. In this case, however, it takes a time from the input of the subsequent job to the execution of the subsequent job due to the assignment change processing.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

It is an object of the present invention to provide a data processing apparatus capable of immediately initiating the processing of a subsequent job or outputting the data of a previous job without delay when the subsequent job is inputted depending on whether the previous job is not required to be outputted without delay.

It is another object of the present invention to provide a data processing method capable of immediately initiating the processing of a subsequent job or outputting the data of the previous job without delay when the subsequent job is inputted depending on whether the previous job is not required to be outputted without delay.

It is still another object of the present invention to provide an image forming apparatus capable of immediately initiating the processing of a subsequent job or outputting the data of the previous job without delay when the subsequent job is inputted depending on whether the previous job is not required to be outputted without delay.

According to the first aspect of the present invention, a data processing apparatus includes one or a plurality of input portions, one or a plurality of output portions, a plurality of compressing/expanding devices which compress data-to-be-outputted included in a job inputted from any one of the input portions and expand the compressed data-to-be-outputted, a job discrimination portion which discriminates whether the job inputted from any one of the input portions is not required to be outputted without delay, and a controller which controls operation assignment of the plurality of compressing/expanding devices depending on a discrimination result of the job discrimination portion and activates assigned compressing/expanding devices for the job.

In this data processing apparatus, the job discrimination portion discriminates whether the job inputted from any one of input portions is not required to be outputted without delay, and the controller controls operation assignment of the compressing/expanding devices depending on the discrimination result of the job discrimination portion. Accordingly, in cases where the inputted job is not required to be outputted without delay, the operation assignment of the compressing/expanding devices can be changed so as to expedite the initiation of the subsequent job. To the contrary, in cases where the inputted job is required to be outputted without delay, the operation assignment of the compressing/expanding devices can be changed so as to expedite the initiation of the inputted job.

Furthermore, since the controller executes the assigned compressing/expanding devices for the inputted job, in cases where the inputted job is not required to be outputted without delay, the operation assignment of the compressing/expanding devices is in a ready-to-execute state for the initiation of the subsequent job at the time when the subsequent job is inputted. Accordingly, there will be no waiting time from an input of the subsequent job to the execution thereof.

According to the second aspect of the present invention, a data processing method includes: discriminating whether an inputted job is not required to be outputted without delay; controlling operation assignment of compressing/expanding devices which compress data-to-be-outputted included in the inputted job and expand the compressed data-to-be-outputted depending on the discrimination result; and activating assigned compressing/expanding devices for the inputted job.

In this data processing method, it is discriminated whether an inputted job is not required to be outputted without delay and the operation assignment of compressing/expanding devices is controlled depending on the discrimination result. Thus, in cases where the inputted job is not required to be outputted without delay, the operation assignment of the compressing/expanding devices can be changed so as to expedite the initiation of the subsequent job, and in cases where the inputted job is required to be outputted without delay, the operation assignment of the compressing/expanding devices can be changed so as to expedite the initiation of the inputted job.

According to the third aspect of the present invention, an image forming apparatus includes a scanner which outputs an original image converted into electric data by a photoelectric transfer element, an input port which receives a print job from an external device including a computer and a facsimile machine, an input adjusting portion which receives a scanned image job outputted from the scanner and the print job inputted into the input portion, a plurality of compressing/expanding devices which compress data-to-be-outputted included in a job inputted from the input portion and expand compressed data-to-be-outputted, a storage which stores the compressed data-to-be-outputted, a discrimination portion which discriminates whether the job inputted into the input adjusting portion is required to be outputted without delay or not required to be outputted without delay, a controller which controls operation assignment of the compressing/expanding devices depending on a discrimination result of the discrimination portion and activates assigned compressing/expanding devices for the job; and a printer which prints out print data of each job expanded by the compressing/expanding devices on a sheet.

In this image forming apparatus, the scanned image job outputted from the scanner or the print job inputted from the input portion is discriminated whether the job is required to be outputted without delay. The controller controls the operation assignment of the compressing/expanding devices depending on the discrimination result of the discrimination portion and activates the assigned compressing/expanding devices for the job.

Accordingly, in cases where the job is not required to be outputted without delay, the operation assignment of the compressing/expanding devices can be changed so as to expedite the initiation of the subsequent job, and in cases where the job is required to be outputted without delay, the operation assignment of the compressing/expanding devices can be changed so as to expedite the initiation of the job.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Figure 1:
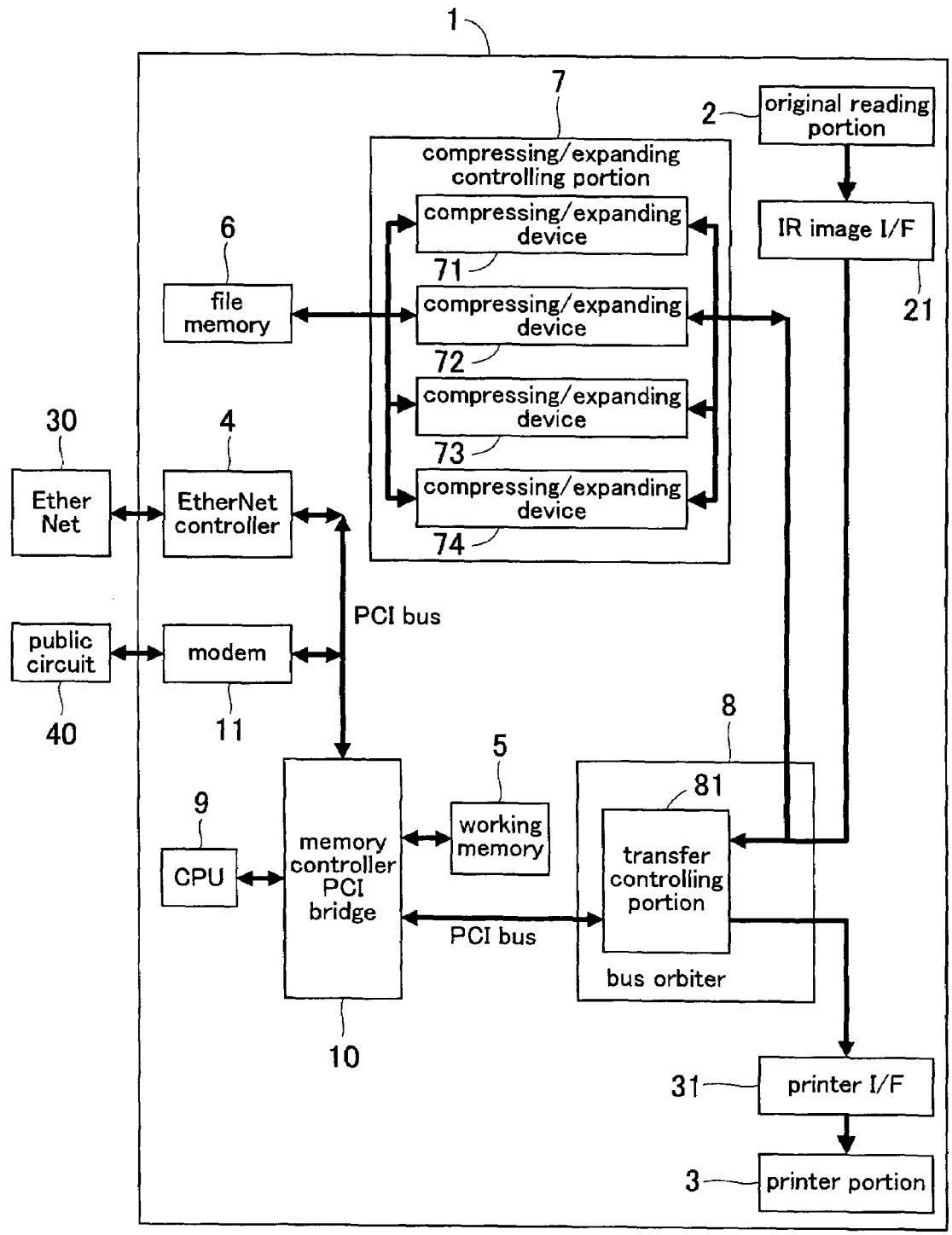
FIG. 1 is a block diagram showing the structure of the data processing apparatus according to an embodiment of the present invention.

FIG. 1 is a block diagram of a MFP 1 as a data processing apparatus according to an embodiment of the present invention.

This data processing apparatus is equipped with a plurality of input portions and a plurality of output portions. In detail, this apparatus is equipped with an original reading portion 2 as an input portion, a printer portion 3 as an output portion, an EtherNtet controller 4 which functions both as an input portion and an output portion and a modem 11 which functions both as an input portion and an output portion.

The original reading portion 2 is equipped with a scanner for reading an original. The read image data is transferred to a bus orbiter 8 via an image reader interface portion 21 (referred to as "IR I/F" in FIG. 1). The printer portion 3 prints out the image data transferred from the bus orbiter 8 on a paper or the like.

Furthermore, the EtherNet controller 4 functions as a transmitter/receiver for transmitting/receiving a job via the EtherNet 30. For example, it receives a print job or an IFAX job transmitted from an external device (not shown), such as a PC or an IFAX, via the EtherNet 30, or transmits the image data read by the original reading portion 2 to an external device via the EtherNet 30.

The modem 11 functions as a transmitter/receiver for transmitting/receiving a FAX job between the modem and a FAX device or the like via a public circuit 40. For example, it receives a job transmitted from an external device, such as a FAX device, via the public circuit 40, or facsimiles the image data of an original read by the original reading portion 2 to an external device via the public circuit 40.

The MFP 1 is equipped with a working memory 5, a file memory 6, a compressing/expanding controlling portion 7, the aforementioned bus orbiter 8, a CPU 9 and a memory controller PCI bridge 10.

The working memory 5 spreads a data-to-be-outputted, such as a print data included in a print job from an external device received by the EtherNet controller 4, a data included in an IFAX-receive job or a FAX-receive job or an image data read by the original reading portion 2, and stores another data.

In this embodiment, the compressing/expanding controlling portion 7 is equipped with a total of four compressing/expanding devices 71 to 74, and controls the compression/expansion of the data-to-be-outputted by the these compressing/expanding devices 71 to 74. In this embodiment, as will be explained later, in cases where the CPU 9 discriminates that the inputted job is not required to be outputted without delay, the compressing/expanding controlling portion 7 sets one of the four compressing/expanding devices 71 to 74 to be a standby state in accordance with the instruction of the CPU 9. To the contrary, in cases where the CPU discriminates that the job is required to be outputted without delay, the controlling portion 7 assigns all of the compressing/expanding devices 71 to 74 to the job.

The file memory 6 stores the data-to-be-outputted compressed by the compressing/expanding devices 71 to 74.

The bus orbiter 8 transfers the data-to-be-outputted to each portion of the MFP in accordance with the instructions of the transfer controlling portion 81.

The memory controller PCI bridge 10 controls the working memory 5 and connects the bus for the CPU 9 and the PCI bus.

The CPU 9 totally controls the entire MFP 1 including the memory controller PCI bridge 10, the transfer controlling portion 81 and the compressing/expanding controlling portion 7. In addition to the above, the CPU 9 further discriminates various matters. For example, the CPU discriminates whether there is an inputted job, whether the inputted job is not required to be outputted without delay or whether the job to be outputted is a first output job or second or subsequent output job.

In this embodiment, as a job which is not required to be outputted without delay, a store print job, a FAX-receive job and an IFAX job inputted from an external device are exemplified. The aforementioned store print job is a print job to be stored, such as a confidential print job and an initially-conduct-first-set-of-print job.

The aforementioned confidential print job is a job which is initiated when an ID code is inputted via an operation portion (not shown) in the MFP 1 after a print instruction by a print requester, which is different from a normal print job in which a print processing is initiated immediately after the print instruction to the MFP 1 by a print requester. The aforementioned initially-conduct-first-set-of-print job is a job in which a first set among a plurality of sets to be printed is initially printed and thereafter the remaining sets are printed based on a predetermined instruction or the remaining sets to be printed can be deleted. In the following explanation, although the initially-conduct-first-set-of-print job is exemplified as a job not required to be outputted without delay, this denotes a print job for the second and subsequent print job.

Figure 2:
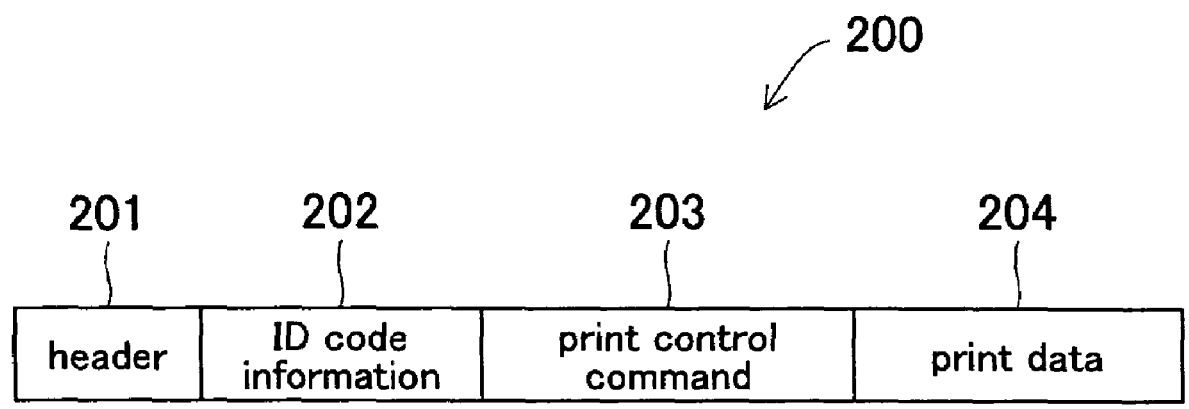
FIG. 2 is an explanatory view showing a data structure of a confidential print job.

The CPU 9 discriminates whether an inputted job is not required to be outputted without delay based on the data structure of the job. An example of a data structure is shown in FIG. 2. This print job data 200 consists of a header 201, an ID code information 202, a print control command 203 and a print data (data-to-be-outputted) 204. The header 201 includes an instruction data showing the output destination specified by a print requester and a data for identifying a print job data including the ID code information.

The ID code information 202 is information to be added to a normal data structure where the print job data is a confidential print job. The print control command 203 and the print data 204 relate to a data concerning the print type (paper size, printing order, paper delivering method, etc.) or a data concerning the print contents, such as a text and an image.

The CPU 9 can discriminate that this print job is a confidential print job from the ID code information 202.

An initially-conduct-first-set-of-print job or an IFAX-receive job not required to be outputted without delay can also be discriminated from the job data structure. When a job is received by the modem 11, the job will be discriminated as a FAX-receive job.

Next, the operation of the MFP 1 shown in FIG. 1 will be explained with reference to the flowchart shown in FIG. 3. In the following explanation and the drawings, "Step" will be abbreviated as "S."

Figure 3:
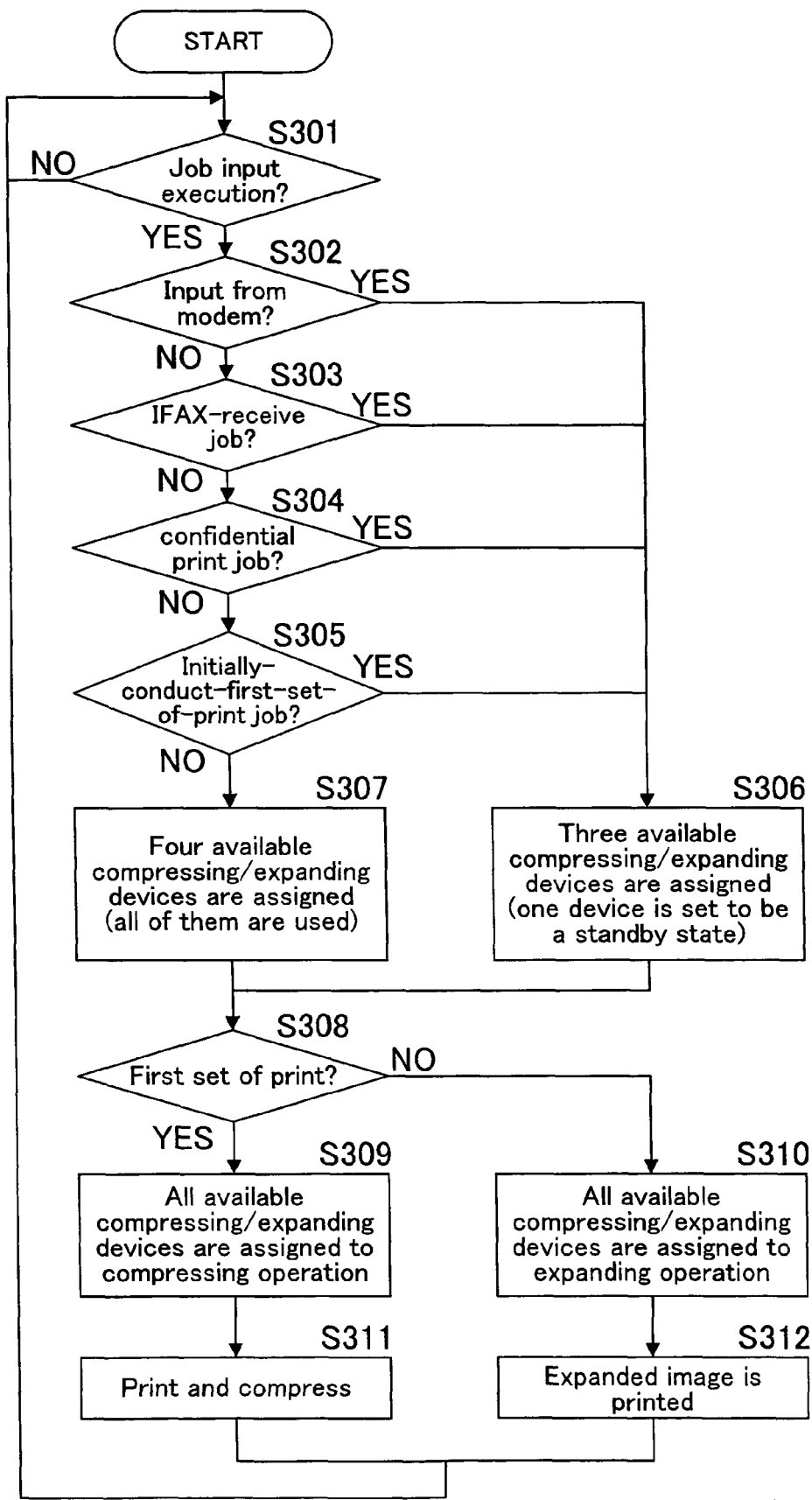
FIG. 3 is a flowchart showing the operation of the data processing apparatus shown in FIG. 1.

In FIG. 3, at S301, the CPU 9 discriminates whether a job is inputted. If there is no inputted job (No at S301), the routine waits as it is. If there is an inputted job (Yes at S301), at S302, the CPU 9 discriminates whether the job is inputted from the modem 11, i.e., whether the job is a FAX-receive job.

If it is discriminated that the job is inputted from the modem 11 (Yes at S302), since the job is not required to be printed without delay, this discrimination result is notified to the compressing/expanding controlling portion 7. Then, the routine proceeds to S306. If it is discriminated that the job is not inputted from the modem 11 (No at S302), at S303, it is discriminated whether the job is an IFAX-receive job.

If it is discriminated that the job is an IFAX-receive job (Yes at S303), since the job is not required to be printed without delay, this discrimination result is notified to the compressing/expanding controlling portion 7. Then, the routine proceeds to S306. If it is discriminated that the job is not an IFAX-receive job (No at S303), at S304, it is discriminated whether the job is a confidential print job.

If it is discriminated that the job is a confidential print job (Yes at S304), since the job is required to be printed without delay, this discrimination result is notified to the compressing/expanding controlling portion 7. Then, the routine proceeds to S306. If it is discriminated that the job is not a confidential print job (No at S304), at S305, it is discriminated whether the job includes a print instruction for the second and subsequent sets of the initially-conduct-first-set-of-print job.

If it is discriminated that the job is the initially-conduct-first-set-of-print job (Yes at S305), since the job is not required to be printed without delay, this discrimination result is notified to the compressing/expanding controlling portion 7. Then, the routine proceeds to S306. If it is discriminated that the job is not the initially-conduct-first-set-of-print job (No at S305), since the job is required to be printed without delay, this discrimination result is notified to the compressing/expanding controlling portion 7. Then, the routine proceeds to S307.

At S306, since the inputted job corresponds to a job which is not required to be printed without delay, the compressing/expanding controlling portion 7 assigns three available compressing/expanding devices (e.g., the compressing/expanding devices 71 to 73) to the inputted job, and sets one compressing/expanding controlling portion 7 (e.g., the compressing/expanding device 74) to be a standby state which will be assigned to the subsequent job. Then, the routine proceeds to S308.

To the contrary, at S307, since the inputted job does not correspond to a job which is required to be printed without delay, the compressing/expanding controlling portion 7 assigns all of the four compressing/expanding devices 71 to 74 to the job. Then, the routine proceeds to S308.

At S308, the CPU 9 discriminates whether the job is the initial set of print job. If it is discriminated that the job is the initial set of print job (Yes at S308), at S309, the compressing/expanding controlling portion 7 assigns all of the available compressing/expanding devices to the compressing operation. Then, at S311, the print data of the inputted job is RIP-spread at the working memory 5 and then transferred to the printer portion 3 for printing. Furthermore, the print data is compressed by using all of the available compressing/expanding devices among the compressing/expanding devices 71 to 74, and the compressed data is stored in the file memory 6. Thereafter, the routine returns to S301. In the case of a confidential print job, the data is compressed without being printed, and the compressed data is stored in the file memory 6.

On the other hand, at S308, if it is discriminated that the job is not the initial set of print job (No at S308), at S310, the compressing/expanding controlling portion 7 assigns all of the available compressing/expanding devices to the expanding operation. Then, at S312, the compressed data read out from the file memory 6 is expanded by using all of the available compressing/expanding devices among the compressing/expanding devices 71 to 74, and the expanded data is transferred to the printer portion 3 via the working memory 5 for printing. Thereafter, the routine returns to S301.

However, in the case of a confidential print job, the job will be expanded by using all of the available compressing/expanding devices and printed when ID code is inputted.

As mentioned above, in cases where the job is not required to be printed without delay, some of the compressing/expanding devices (in this embodiment, the compressing/expanding devices 74) among the compressing/expanding devices 71 to 74 are set to be a standby state for the subsequent job. Therefore, in cases where the subsequent job, such as the so-called scan-out job for outputting the image data read by the original reading portion 2 to an external device or a copy job for printing the image data read by the original reading portion 2, is inputted during the processing of the job not required to be printed without delay, the compression processing of this job can be performed by using the compressing/expanding device 74 in a standby state. Accordingly, the reading of the image data at the original reading portion for the scan-out job or the copy job can be initiated. Furthermore, since the operation assignment of the compressing/expanding devices 71 to 74 which are being used for the current job is not changed when the subsequent job is inputted, no waiting time from the input of the subsequent job to the actual initiation of the job will be required.

Figure 4:
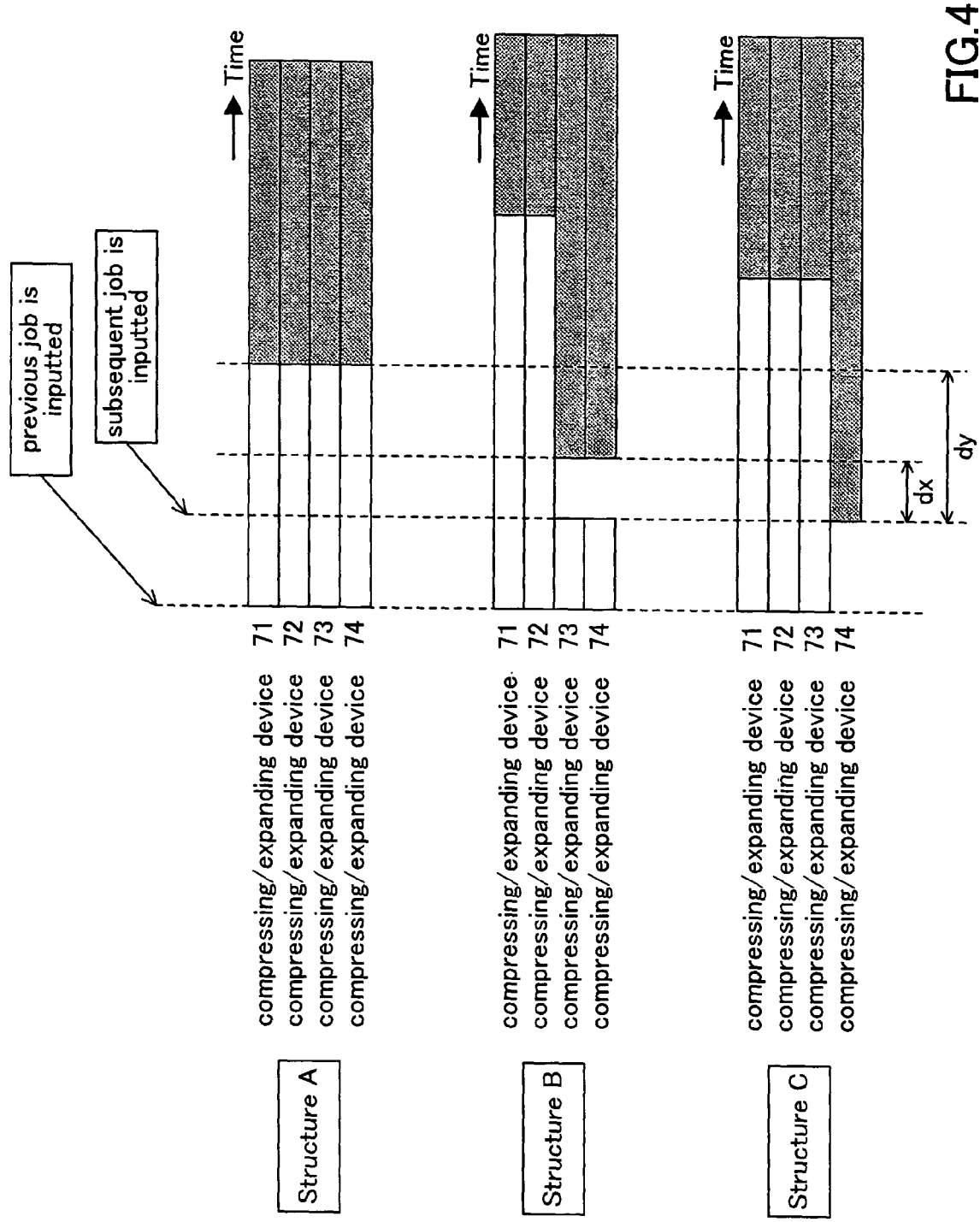
FIG. 4 is an explanatory view showing the effects obtained by the data processing apparatus according to the embodiment in cases where the previous job is not required to be outputted without delay.

The above will be explained in detail with reference to FIG. 4. The structure A shown in FIG. 4 show a conventional structure in which all of the compressing/expanding devices are assigned to the previous job and the assignment cannot be changed. In FIG. 4, the white portion denotes the current processing of the job (previous job) and the hatched portion denotes the processing of the subsequent job.

In the structure B, all of the compressing/expanding devices 71 to 74 are assigned to the previous job. However, when the subsequent job is inputted, the operation assignment of the compressing/expanding devices is changed such that two of the compressing/expanding devices 73 and 74 are assigned to the subsequent job.

The structure C is a structure of an embodiment of the present invention in which one compressing/expanding device 74 is set to be a standby state in cases where the previous job is not required to be printed without delay.

In the above, the previous job is a job not required to be printed without delay and the subsequent job is a scan-out job or a copy job.

In the structure A, in order to receive the subsequent job, it is necessary that the previous job is completed. Therefore, a waiting time "dy" from the input of the subsequent job to the initiation of the processing of the job will be required.

In the structure B, since the operation assignment of the compressing/expanding devices will be changed when the subsequent job is inputted, the initiation of the processing of the job will not be performed immediately. A waiting time "dx" from the input of the subsequent job to the initiation of the processing of the job will be required.

To the contrary, in the structure C, although the completion of the previous job which is not required to be printed without delay will be delayed, the subsequent job can be processed immediately.

Figure 5:
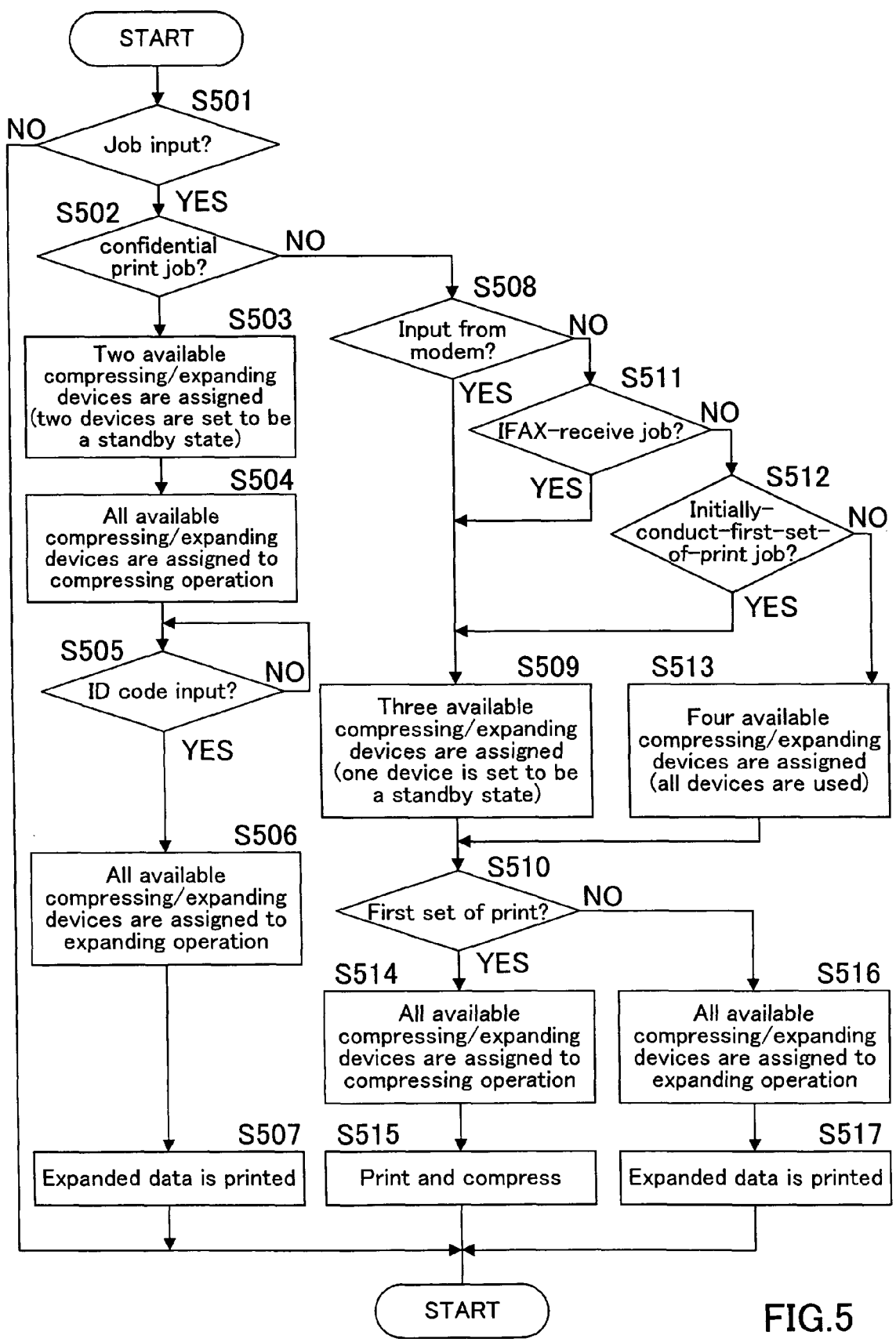
FIG. 5 is a flowchart showing the operation of the data processing apparatus shown in FIG. 1 according to another embodiment of the present invention.

FIG. 5 shows another embodiment of the present invention. In this embodiment, even if the job is not required to be printed without delay, the operation assignment of the compressing/expanding devices is changed depending on the type of the job.

In FIG. 5, at S501, the CPU 9 discriminates whether there is a job input. If there is no input (No at S501), the routine waits as it is. If there is an input (Yes at S501), at S502, it is discriminated whether the inputted job is a confidential print job.

If it is discriminated that the job is a confidential print job (Yes at S502), since the job is not required to be printed without delay, the discrimination result is notified to the compressing/expanding device 7, and the routine proceeds to S503. At S503, the compressing/expanding controlling portion 7 assigns two available compressing/expanding devices (e.g., compressing/expanding devices 71 and 72) among the four compressing/expanding devices 71 to 74 to the confidential print job, and sets the remaining two compressing/expending devices (e.g., compressing/expanding devices 73 and 74) to be a standby state for the subsequent job.

Subsequently, at S504, the print data is RIP-spread in the working memory 5, and thereafter transferred to the compressing/expanding devices. All of the available compressing/expanding devices 71 and 72 are assigned to the compressing operation to compress the print data, and the compressed data is stored in the file memory 6.

Subsequently, at S505, the CPU 9 discriminates whether the ID code for printing the confidential print job is inputted. If the ID code is not inputted (No in S505), the routine waits until the code is inputted. When the ID code is inputted (Yes at S505), at S506, all of the available compressing/expanding devices 71 and 72 are assigned to the expansion processing to expand the compressed data read out from the file memory 6. Then, at S507, the expanded print data is transferred to the printer portion 3 via the working memory 5 and printed. Thereafter, the routine returns to S501.

At S502, if it is discriminated that the job is not a confidential print job (No at S502), the CPU 9 discriminates whether the job is inputted from the modem 11 or the job is a FAX-receive job.

If it is discriminated that the job is inputted from the modem 11 (Yes at S508), since the job is not required to be printed without delay, the discrimination result will be notified to the compressing/expanding controlling portion 7. Then, the routine proceeds to S509. If it is discriminated that the job is not inputted from the modem 11 (No at S508), at S511, it is discriminated whether the job is an IFAX-receive job.

If it is discriminated that the job is an IFAX-receive job (Yes at S511), since the job is not required to be printed without delay, the discrimination result will be notified to the compressing/expanding controlling portion 7. Then, the routine proceeds to S509. If it is discriminated that the job is not an IFAX-receive job (No at S511), at S512, it is discriminated whether the job is a job including the print instruction for printing the second and subsequent sets of print job of the initially-conduct-first-set-of-print job.

If it is discriminated that the job is the initially-conduct-first-set-of-print job (Yes at S512), since the job is not required to be printed without delay, the discrimination result will be notified to the compressing/expanding controlling portion 7. Then, the routine proceeds to S509. If it is discriminated that the job is not the initially-conduct-first-set-of-print job (No at S512), since the job is required to be printed without delay, the discrimination result will be notified to the compressing/expanding controlling portion 7. Then, the routine proceeds to S513.

At S509, the compressing/expanding controlling portion 7 assigns three of the available compressing/expanding devices (e.g., compressing/expanding devices 71 to 73) to the job, and sets one compressing/expanding device (e.g., compressing/expanding device 74) to be a standby state for the subsequent job. Then, the routine proceeds to S510. In other words, in cases where the job is a FAX-receive job, an IFAX-receive job or an initially-conduct-first-set-of-print job, three compressing/expanding devices 71 to 73 are assigned to the job.

On the other hand, at S513, the compressing/expanding controlling portion 7 assigns four available compressing/expanding devices 71 to 74 to the job. Then, the routine proceeds to S510. In other words, in cases where the job is required to be printed without delay, all of the compressing/expanding devices 71 to 74 are assigned to the job.

At S510, it is discriminated whether the job is for the first set of print job. If it is discriminated that the job is for the first set of print job (Yes at S510), at S514, the compressing/expanding controlling portion 7 assigns all of the available four available compressing/expanding devices 71 to 74 to the job. At S515, the print data of the inputted job is spread in the working memory 5, and thereafter is transferred to the printer portion 3 for printing. Further, the data is compressed by using all of the available compressing/expanding devices 71 to 73, and the compressed data is stored in the file memory 6. Then, the routine returns to S501.

On the other hand, at S510, if it is discriminated that the job is not for the first set of print (No at S510), at S516, the compressing/expanding controlling portion 7 assigns all of the available compressing/expanding devices to the job. At S517, the compressed data read out from the file memory 7 is expanded by using all of the available compressing/expanding devices, and the expanded data is transferred to the printer portion 3 via the working memory 5 for printing. Then, the routine returns to S501.

As mentioned above, in this embodiment, even if the inputted job is a job which is not required to be printed without delay, if the job is a confidential print job, two compressing/expanding devices are assigned to the job, and if the job is a FAX-receive job, an IFAX-receive job or an initially-conduct-first-set-of-print job, three compressing/expanding devices are assigned to the job. As mentioned above, even if the inputted job is a job which is not required to be printed without delay, by changing the operation assignment of a plurality of compressing/expanding devices depending on the type of the job, more appropriate processing can be performed.

Although an embodiment of the present invention is explained, the present invention is not limited to the embodiment. For example, in the embodiment, one or two compressing/expanding devices among a plurality of compressing/expanding devices are set to be a standby state, three or more compressing/expanding devices may be set to be standby state and at least one compressing/expanding device may be assigned to the subsequent job.

Furthermore, although it is discriminated whether the job transmitted from an external apparatus is not required to be outputted without delay, it may also be discriminated whether the job read by the original reading portion 2 is not required to be outputted without delay.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A data processing apparatus, comprising: one or a plurality of input portions for inputting a job having a data structure; one or a plurality of output portions; a plurality of compressing/expanding devices which compress data-to-be-outputted included in the job inputted from any one of said input portions and expand the compressed data-to-be-outputted; a job discrimination portion which discriminates, from the data structure of the job, whether the job inputted from any one of said input portions is not required to be outputted without delay; and a controller which controls operation assignment of said plurality of compressing/expanding devices depending on a discrimination result of said job discrimination portion and activates assigned compressing/expanding devices for the job;

wherein, in cases where said job discrimination portion discriminates that the job is not required to be outputted without delay, said controller assigns some of said plurality of compressing/expanding devices so as not to process the job, and wherein, in cases where said job discrimination portion discriminates that the job is required to be outputted without delay, said controller assigns all of said plurality of compressing/expanding so as to process the job.

2. The data processing apparatus as recited in claim 1 wherein said any one of output portions is a printer portion, and wherein the job not required to be outputted without delay is a store print job including a confidential print job and an initially-conduct-first-set-of-print job.

3. The data processing apparatus as recited in claim 1, wherein said any one of output portions is a printer portion, and wherein the job not required to be outputted without delay is a facsimile-receive job or an internet-facsimile-receive job to be inputted from outside.

4. The data processing apparatus as recited in claim 1, wherein, in cases where said job discrimination portion discriminates that the job is not required to be outputted without delay, said controller further changes the operation assignment of said compressing/expanding devices depending on the type of the job.

5. The data processing apparatus as recited in claim 1, wherein, in cases where a subsequent job is inputted from another input portion during the processing of the current job, said controller activates some of compressing/expanding devices set to be a standby state to execute compression processing of the subsequent job.

6. The data processing apparatus as recited in claim 1, wherein said delay comprises a user-initiated delay.

7. A data processing apparatus, comprising: one or a plurality of input portions for inputting a job having a data structure; one or a plurality of output portions; a plurality of compressing/expanding devices which compress data-to-be-outputted included in the job inputted from any one of said input portions and expand the compressed data-to-be-outputted; a job discrimination portion which discriminates, from the data structure of the job, whether the job inputted from any one of said input portions is not required to be outputted without delay; and a controller which controls operation assignment of said plurality of compressing/expanding devices depending on a discrimination result of said job discrimination portion and activates assigned compressing/expanding devices for the job;

wherein, in cases where said job discrimination portion discriminates that the job is not required to be outputted without delay, said controller changes the operation assignment of said compressing/expanding devices so as to expedite initiation of a subsequent job, and wherein, in cases where said job discrimination portion discriminates that the job is required to be outputted without delay, said controller changes the operation assignment of said compressing/expanding devices so as to enable early outputting of the job.

8. The data processing apparatus as recited in claim 7, wherein, in cases where said job discrimination portion discriminates that the job is not required to be outputted without delay, said controller further changes the operation assignment of said compressing/expanding devices depending on the type of the job.

9. The data processing apparatus as recited in claim 7, wherein, in cases where a subsequent job is inputted from another input portion during the processing of the current job, said controller activates some of compressing/expanding devices set to be a standby state to execute compression processing of the subsequent job.

10. The data processing apparatus as recited in claim 8, wherein, in cases where the job not required to be outputted without delay is a confidential print job, said controller sets more compressing/expanding devices than those required for another job not required to be outputted without delay to be a standby state.

11. The data processing apparatus as recited in claim 7, wherein said any one of output portions is a printer portion, and wherein the job not required to be outputted without delay is a store print job including a confidential print job and an initially-conduct-first-set-of-print job.

12. The data processing apparatus as recited in claim 7, wherein said any one of output portions is a printer portion, and wherein the job not required to be outputted without delay is a facsimile-receive job or an internet-facsimile-receive job to be inputted from outside.

13. The data processing apparatus as recited in claim 7, wherein said delay comprises a user-initiated delay.

* * * * *

UNITED STATES PATENT AND TRADEMARK OFFICE
CERTIFICATE OF CORRECTION

PATENT NO. : 7,643,163 B2 Page 1 of 1
APPLICATION NO. : 10/626672
DATED : January 5, 2010
INVENTOR(S) : Sakiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1565 days.

Signed and Sealed this

Sixteenth Day of November, 2010

David J. Kappos
*Director of the United States Patent and Trademark Office*